Aug. 6, 1963   E. B. CARPENTER   3,099,981
FOWL WATERER
Filed July 19, 1961
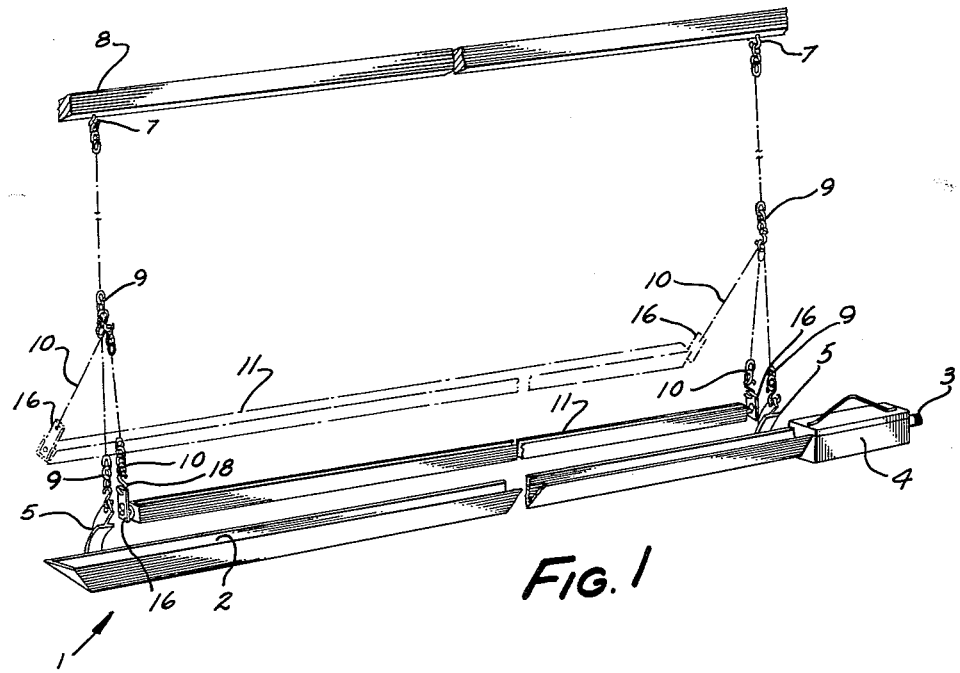
FIG. 1
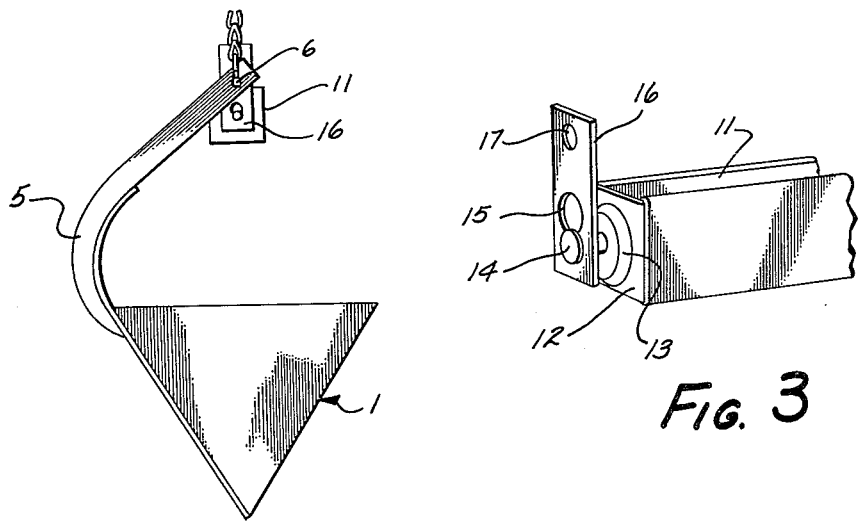
FIG. 2
FIG. 3
INVENTOR.
ELMER B. CARPENTER
BY
ATTORNEYS

United States Patent Office 3,099,981
Patented Aug. 6, 1963

3,099,981
FOWL WATERER
Elmer B. Carpenter, Springdale, Ark., assignor to Automatic Poultry Feeder Company, Zeeland, Mich., a corporation of Michigan
Filed July 19, 1961, Ser. No. 125,130
3 Claims. (Cl. 119—61)

This invention relates to poultry feeding equipment and more particularly to a waterer for poultry.

It is essential to the proper raising of animals such as poultry that they be constantly provided with an adequate source of clean food and water. For this purpose water troughs have been provided many of which are equipped with automatic water supply devices. However, these watering troughs have not been entirely satisfactory.

One of the biggest problems experienced with the watering of poultry is the prevention of perching by the poultry either on the trough or immediately above it. When this occurs, the poultry deposit their droppings in the water. Frequently the poultry will collect in such numbers on the trough that they prevent other poultry from using the trough as a drinking font. Poultry drippings in the water require frequent cleaning. This cleaning has to be carefully done and in a large establishment this requires many hours of expensive man power. To overcome this problem, wires, rails, or bars have been mounted above the trough to prevent the birds from perching on the trough itself. To some extent these devices have been successful in discouraging the use of the trough as a perch by the birds. Further, these bars have been devised of such shape, such as rollers or triangular bars, that they do not provide stable perches for the birds. In most cases they are rotatably mounted so that a bird attempting to perch on them is thrown off balance by the rotation of the bar. However, even these devices have failed to eliminate the problem. Many birds master the problem of successfully landing on such unstable perches and of stabilizing their balance so they can remain on the bar.

This invention overcomes these difficulties by providing a bar which will not permit the bird to stabilize its position. When a bird attempts to perch on the bar of this invention the bar not only rotates while he is attempting to stabilize himself but also swings like a pendulum. This causes the bird's center of balance to shift. While the bird may have landed in such a manner as not to cause rotation of the bar, the bird's attempt to stabilize itself, as a result of the pendulous swing of the bar, will cause the bird to perform such acrobatics that the bar will positively be rotated and the bird will not be able to stabilize its position and thus obtain a perch. This forces the bird to leave the bar. Thus, the invention has accomplished its purpose.

The invention has other advantages besides that of being an effective anti-perching device. By being suspended for free swinging motion, the bar may be easily pushed out of the way when the trough is to be cleaned. This affords full access to the trough, making cleaning easier and quicker. Further, such cleaning may be done more thoroughly. Since both the trough and the anti-perch rail or bar are independently suspended from a fixed support, the swinging movement of the bar will not be transmitted to the trough. This also leaves the floor beneath the trough clear with no interference to quick and thorough cleaning.

These and other objects and purposes of this invention will be immediately understood by those acquainted with the design and use of poultry feeding equipment upon reading the following specification and the accompanying drawings.

In the drawings:

FIG. 1 is an oblique view of a water trough equipped with this invention showing the anti-perch bar in normal position in solid lines and in displaced position in dotted lines;

FIG. 2 is a fragmentary, enlarged, end view of this invention;

FIG. 3 is an enlarged, fragmentary, oblique view of the attachment structure between the anti-perch bar and its suspending means.

In executing the objects and purposes of this invention there has been provided a watering trough which preferably is suspended from above. An anti-perch bar or rail is suspended above this trough. The bar or rail is so suspended that it is freely swingable without in any way disturbing the position of the trough. It may swing to either side of the trough and further is rotatable about its greater axis.

Referring specifically to the drawings, the numeral 1 indicates a trough having an open top side 2, a water supply conduit 3, and a water level regulating mechanism 4. The trough is kept partially full of water by the regulating mechanism 4 so that a supply of fresh water is constantly available to the poultry.

The trough is equipped with a pair of hanger brackets 5. The hanger brackets may be secured to the trough in any suitable manner such as by welding. The upper portion of the hanger brackets 5 curve inwardly over the trough and at a point along the center of gravity of the trough they are equipped with apertures 6. The hanger brackets 5 are spaced apart a substantial distance along the trough so that it will be stably supported lengthwise.

A pair of eye-hooks 7, spaced apart the same distance as the hanger brackets 5, are secured to any suitable structure above the trough. This may be a beam as suggested by 8 or any other available support. A pair of chains 9 are secured one to each of the anchor hooks. These hang down from the anchor hooks and on their lower ends are equipped with a suitable hook to engage the aperture 6 in the hanger brackets 5. This supports the trough.

This structure suspends the trough from overhead structure. It has no structure touching the floor, leaving the latter freely accessible.

At a distance well above the trough, a second pair of chains 10 are hooked into the chains 9. These chains support the anti-perch rail or bar 11. At each end of the anti-perch bar 11 has a terminal plate 12 characterized by a boss 13 at its center. A headed pin 14 projects from the center of the boss 13. The pins 14 on each end of the anti-perch bar 11 seat in a key-hole type slot 15 in the hanger plate 16. The keyhole type slot 15 has an enlarged portion big enough to pass the head of the pin 14 and a smaller lower portion just big enough to receive the shank of the pins. At its upper end the hanger plate 16 has a hole 17 which receives a hook 18 on the end of the chain 10. The length of the anti-perch bar 11 is such that the hanger plates 16 are spaced apart a shorter distance than the spacing between the chains 9. This assures a slight inward sloping of the chains 10 from the chains 9 whereby movement of the chains 10 will not interfere with the chains 9.

The pins 14 are centered on the anti-perch bar 11 and are freely rotatable with respect to the hanger plates 16. This permits the anti-perch bar to rotate freely and easily. The length of the chains 10 is such that the anti-perch bar 11 may swing a substantial distance to either side of the trough. This swinging motion will be initiated by even the slightest side pressure applied to the bar.

It will be seen that the bar 11 suspended over the trough prevents the poultry from perching on the sides of the trough. The bar will keep them off balance and will force them to leave the perch. Should a bird attempt to use the bar 11 as a perch, the momentum of the bird's body as it attempts to land on the bar 11 will start it swinging sideways of the trough. As this occurs, the bird's center of balance will shift and the bird will attempt to stabilize itself by moving its feet on the bar. This will initiate the rotation of the bar, thus completely frustrating the bird. The more the bird struggles to stabilize its position on the bar, the more the bar will be induced to swing and to rotate, making it impossible for the bird to obtain a stable perch. After a few moments of this, the bird will leave or fall off.

While the bird is attempting this maneuver, should another bird attempt to perch on the side of the trough, the backward swinging motion of the bar returning to its normal position will knock the second bird from the side of the trough. Thus the water trough is kept free of perched fowl. This assures a clean supply of water. It also assures that the water trough will be available to the birds because their use of it will not be interfered with by other birds perching on and around it.

The cleaning of the trough is made easy since with the hanger brackets 5 on one side of the trough the operator, to gain full access to the trough, merely has to push the anti-perch bar 11 to one side while he performs the cleaning operation. This assures speed and efficiency in cleaning the trough. Also, the trough, being suspended from above, has no structure reaching down to the floor. Therefore, the entire area beneath the trough is unobstructed and may be quickly and completely cleaned. The height to which the trough is suspended above the floor will depend upon the particular type of poultry being raised and their age. As the poultry grow, the trough will be raised from time to time to a height from which the birds can drink easily but above that at which droppings can be deposited in the trough.

It will be recognized that while the chains 10 are anchored to the chains 9, that they can just as well be extended all the way up to the beam 8 and either secured to the anchor fitting 7 or separate anchor fittings may be used for this purpose, if desired. However, the suspending of the anti-perch bar 11 from a point substantially above the trough from the same chains as those that support the trough will not cause instabilities in the trough 1. The combination of the weight of the trough and of the water in it, together with the resistance to movement provided by the water supply conduit 3, will tend to keep the trough stable even though heavy birds such as turkeys attempt to alight on the anti-perch bar 11.

It will be recognized that various modifications of this invention may be made such as by substituting equivalent conventional flexible supports such as rope or jointed wire hangers for the chain, or the shape and size of the anti-perch bar or that of the trough 1 may be varied without in any way departing from the spirit of this invention. All such modifications which embody the invention herein described are to be considered as covered by the hereinafter appended claims unless these claims, by their language, expressly state otherwise.

I claim:

1. A device for watering and feeding poultry comprising: a trough and a support therefor; an anti-perch bar and means suspending said anti-perch bar parallel to and above said trough, said means being freely suspended from above in the manner of a pendulum permitting said bar to swing to either side of said trough when a fowl attempts to alight upon it; said anti-perch bar being rotatably mounted to said means.

2. A device for watering and feeding poultry comprising: a trough and a support therefor; an anti-perch bar and flexible means suspending said anti-perch bar above said trough, said means being freely suspended from above in the manner of a pendulum permitting said bar to swing to either side of said trough when a fowl attempts to alight upon it; said anti-perch bar being rotatably mounted to said means.

3. A device for watering and feeding poultry comprising: a trough and a support therefor suspending said trough from above; an anti-perch bar and means suspending said anti-perch bar parallel to and a short distance above said trough, said means being flexible and freely suspended from above in the manner of a pendulum permitting said bar to swing to either side of said trough when a fowl attempts to alight upon it; said anti-perch bar being rotatably mounted to said means.

References Cited in the file of this patent

UNITED STATES PATENTS

| | | |
|---|---|---|
| 1,190,892 | Hartt | July 11, 1916 |
| 1,881,023 | Hoeft | Oct. 4, 1932 |
| 2,584,782 | Beckman | Feb. 5, 1952 |
| 2,795,209 | Lewis | June 11, 1957 |
| 2,795,210 | Eronen | June 11, 1957 |
| 2,843,087 | Gray | July 15, 1958 |
| 3,006,321 | Bailey | Oct. 31, 1961 |
| 3,034,481 | Godshalk | May 15, 1962 |